May 16, 1961   W. T. HICKS ET AL   2,984,212
POSITIONING DEVICE FOR MOVING A MEMBER TO SELECTED POSITIONS
Filed Sept. 2, 1959
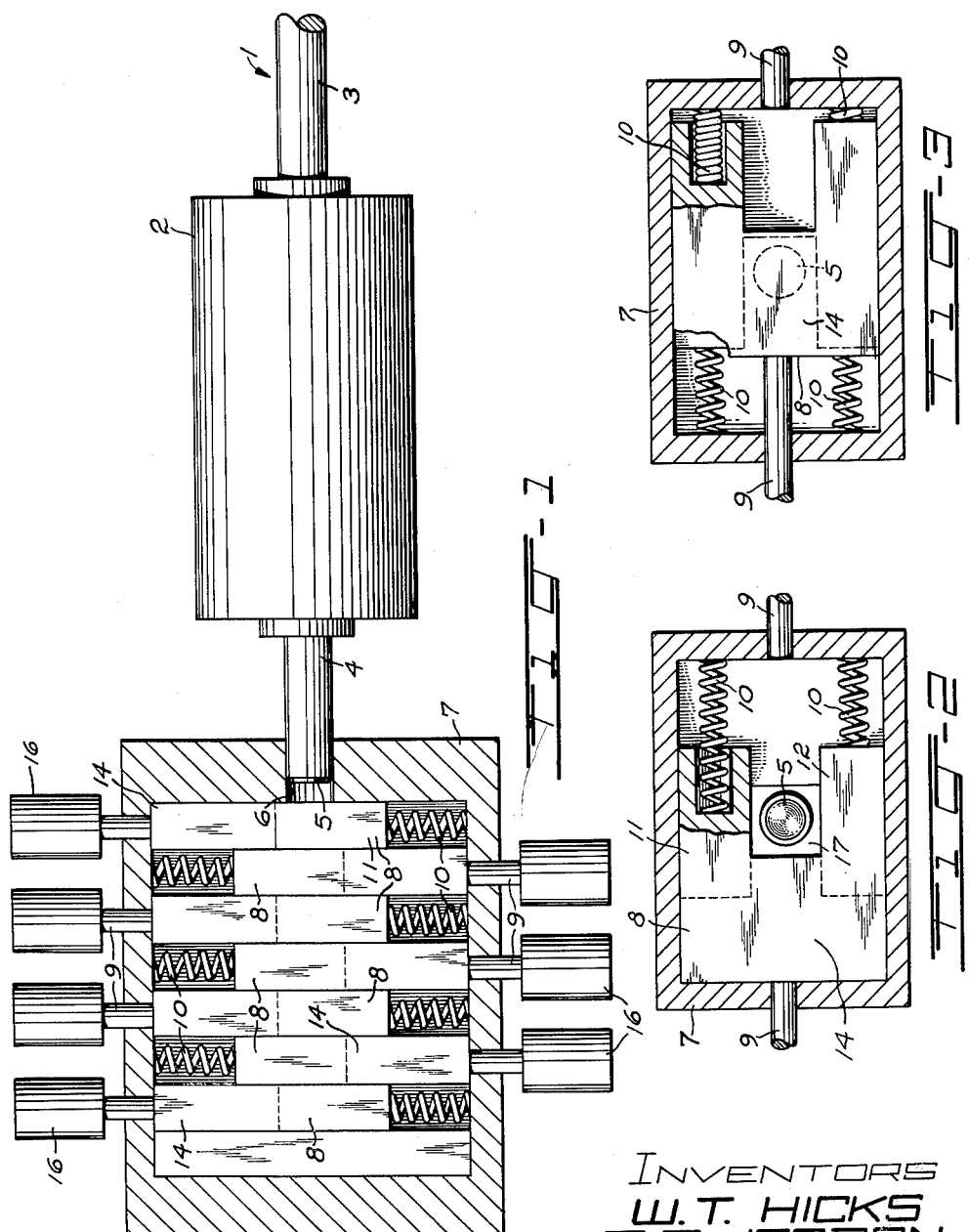
INVENTORS
W. T. HICKS
B. B. JORDAN
A. S. ORDECKI
BY S. Gundersen
ATTORNEY

United States Patent Office 2,984,212
Patented May 16, 1961

2,984,212
POSITIONING DEVICE FOR MOVING A MEMBER TO SELECTED POSITIONS

William T. Hicks, Glen Rock, Ben B. Jordan, Watchung, and Adam S. Ordecki, Cranford, N.J., assignors to Western Electric Company, Incorporated, New York, N.Y., a corporation of New York Filed Sept. 2, 1959, Ser. No. 837,752
2 Claims. (Cl. 121—40)

This invention relates to positioning devices and more particularly to a mechanism for selectively positioning the piston of a fluid cylinder.

In the manufacture or testing of various devices, it is sometimes necessary to accurately position an elongated member such as the piston rod of a fluid cylinder. For example, a gage for measuring the depth of cavities may be affixed to the end of the piston of an air cylinder. Accurate and fast positioning of the piston is required to make such a gage economic. It has been proposed that the positioning of such piston rod be accomplished by means of a dog and ratchet mechanism. Tooth wear and clatter, occurring when the dog slips over the teeth, precludes the use of such a mechanism for accurate work. It has also been proposed that a magnetic brake be mounted about the piston. However, a magnetic brake requires a complex timing mechanism to stop and hold the piston exactly at its desired position.

An object of the present invention is to provide a simple and accurate device for positioning the piston of a fluid cylinder.

Another object is to provide a positioning device for a piston which can be electrically controlled.

In accordance with the general features of this invention, a work piece, gage or other member to be positioned is connected to the piston rod of a fluid cylinder. The travel of the piston rod can be arrested at a selected position by any one of a plurality of stop members of known thickness which can be selectively moved into the path of the rod.

In a preferred embodiment, a plurality of U-shaped blocks facing in alternate directions are mounted about the piston rod of a fluid cylinder. Each block is independently controlled so as to slide into the rod's path of travel. Specifically, the bottom of the U of one of the blocks, through external control, for example, a solenoid, slides into the piston's path, blocking and positioning it while the arms of the U block rest solidly against the other blocks. The rod passes through the arms of the unactuated blocks.

Other objects and features of the invention will be apparent from the following detailed description and accompanying drawings, in which:

Fig. 1 is a top plan view of the positioning device, and

Figs. 2 and 3 are front views of the blocks showing, respectively, their open and closed positions.

Referring now to the drawings, in Fig. 1 piston rod 1 slides within cylinder 2 and consists of two parts, front end 3 and rear end 4. In fluid cylinders operated by air, this type of device is known as a "double-ended" piston. Portion 5 of rear end 4 slides within opening 6 in the front portion of positioning box 7. Within positioning box 7 and slidable transversely with respect to the path of travel of piston 1 are a plurality of U-shaped blocks 8, each having arms 11 and 12 and a base portion 14. Each block 8 is of predetermined thickness and is actuated by a shaft portion 9 which extends through positioning box 7. Each block 8 is spring loaded by means of a pair of springs 10, which are compressed between the ends of the arms 11 and 12 and a side wall of positioning box 7. Blocks 8 are arranged in positioning box 7 so that, in their unactuated position, their arms 11 and 12 collectively form a passageway 17 for the rear end 4 of rod 1. This arrangement is accomplished by spring loading a block 8 so that its portion 14 is flush against one of the sides of positioning box 7, and corresponding portion 14 of the next block 8 is flush against the opposite side of box 7, and by alternately arranging the remaining blocks 8.

Shafts 9 of blocks 8 are actuated by solenoids 16. Upon closing of a switch (not shown) solenoid 16 slides the portion 14 of block 8 away from the side wall of positioning box 7, thereby compressing spring 10 and interposing portion 14 into the path 17 traversed by end portion 4 of the piston.

In Fig. 2, none of the blocks 8 have been actuated by a solenoid 16 and path 17 is therefore unobstructed. In Fig. 3, block 8, the block at the extreme left in Fig. 1, has been forced away from the left side of positioning box 7 and actuated toward the right side. Springs 10 have been compressed by such movement and path 17 has been closed by portion 14 of U-shaped block 8. It will be noted that the portion 14 rests against the arms of any blocks that are between it and the back of positioning box 7 affording a firm support for portion 14 against the pressure of piston 1.

In operation, one of the solenoids is actuated by closing a switch in the energizing circuit therefor, sliding one of the blocks 8 and obstructing path 17 at a predetermined point. Piston 1 rides through path 17 until portion 5 is stopped by an actuated block 8. The pressure of end 5 against actuated block 8 is sufficient, without further operation of solenoid 16, to maintain block 8 in its extended position. Release of piston 1, if the switch has previously been released, causes block 8 to return through the pressure of springs 10, to its normal position. Selective solenoid operation therefore controls the length of extension of piston 1.

Various modifications may be made in this invention without departing from the scope thereof, such as operation of the U-shaped blocks by selected fluid pressures, and arrangement of the U-shaped blocks facing in three or more directions away from the path of travel of the piston.

What is claimed is:

1. A device for positioning an elongated member in a predetermined position, comprising a housing, a series of blocks arranged in succession in said housing, each block directly engaging an adjoining block and being adapted to move transverse to the path of travel of the elongated member, portions of the successive blocks forming collectively a tunnel for travel of the elongated member when the blocks are in first positions, and means for selectively operating one of the blocks to its second position so that a portion of the operated block is interposed in the tunnel to stop movement of the elongated member at a predetermined position.

2. A device according to claim 1 wherein the blocks comprise a series of U-shaped members, the arms of the U-shaped members extending alternately in opposite directions to define said tunnel, and individual spring means for urging the U-shaped members in a direction opposite to the direction in which the arms extend.

References Cited in the file of this patent
UNITED STATES PATENTS

| | | |
|---|---|---|
| 1,129,741 | Shannon | Feb. 23, 1915 |
| 1,965,751 | Rush | July 10, 1934 |
| 2,118,890 | Maes | May 31, 1938 |
| 2,597,361 | Mott | May 20, 1952 |
| 2,821,172 | Randall | Jan. 28, 1958 |
| 2,860,751 | Seigle | Nov. 18, 1958 |